United States Patent Office 3,202,593
Patented Aug. 24, 1965

3,202,593
ELECTROLYTIC PRECIPITATION OF COPPER
William Hardiek, Wilmington, Del., assignor, by mesne assignments, to Metallurgical Processes Ltd., Nassau, New Providence, Bahamas, a corporation of the Bahamas
No Drawing. Filed Aug. 23, 1962, Ser. No. 218,827
3 Claims. (Cl. 204—106)

The present invention is a continuation-in-part of application Serial No. 156,352, filed December 1, 1961 (now abandoned), and relates to a method for recovering by electrolysis substantially all of the total amount of copper in high grade form from eletcrolyte solutions formed by solubilizing non-ferrous metals from certain ore, such pyrite.

Pyrite, which is essentially the natural sulfide of iron, contains a small but valuable quantity of cobalt. In addition, metals, such as copper, manganese, nickel and zinc are also present.

Before valuable metals like cobalt etc. can be recovered from a solution containing the metals solubilized or dissolved from pyrite, it is first necessary to separate and recover all of the copper from the solution. After the copper removal, the cobalt and remaining metals can be separated from the solution.

Heretofore, the processes used for separating the copper from the cobalt have proved to be expensive, time-consuming, and required an extensive amount of equipment and space.

Heretofore, it was necessary to use anyone of several chemical processes or a two step (electroyltic and chemical) process to separate the copper.

Most commonly used for chemical separation are: cementation with scrap iron, precipitation as a sulphide, precipitation as cuprous chloride, and precipitation with alkalis. Anyone of these processes will, if properly manipulated, separate all the copper from the solution. One big disadvantage of any or all of these methods is a loss of metals that are subsequently to be recovered from the solution, such as cobalt, nickel, zinc, etc. The losses vary with the relative concentration of copper and the other metals to be recovered, and are usually of a magnitude from five to fifteen percent. The main drawback of any or all of these chemical processes for separating copper is that the value of the chemically recovered copper is about eight cents per pound less than electrolytically recovered copper.

The two step separation of copper from solution mentioned above is a combination of electrolytic and chemical method. Here, the bulk of the copper is separated electrolytically and the remainder is separated by any one of the chemical processes mentioned above. The drawback of this method is that it takes two units, an electrolytic plant and a chemical plant to separate all the copper from the solution. In addition, the chemically separated copper has all the drawbacks of that mentioned above under chemical processes for separating copper from solution.

In the above two step operation, the second chemical separation step for removing the small final amounts of copper was found to be necessary since if the first step electrolysis was continued until all the copper was deposited on the electrode, the small final amounts of copper deposited in loose form and assumed a dark color. In other words, the final small amounts of copper deposited were of very low grade and the quality of the deposit was thus diminished. This was probably due to the fact that the current density used throughout the process was too much for the reduced copper concentration of the electrolyte. It was therefor better to run the electrolysis up to the point at which the loose and dark copper started to deposit on the electrode and to separate the small remaining amount of copper from the electrolyte by the second step chemical process.

To overcome the above problem and to accomplish separating substantially all of the copper in a one step electrolysis, it is known that with a stepwise reduction of current density near the end of the process in a batch operation that substanially all of the copper will deposit in adherent form and the depositing of the loose, darkened form of copper is thus avoided. In this connection, reference is made to U.S. Patent 725,998 of 1903.

It has now surprisingly been found that substantially all of the copper may be recovered as high grade copper from an electrolyte by electrolysis without reducing the current density and without using the second chemical separation step.

It is, therefore, one object of the invention to recover by electrolysis up to about 99.9% of the total amount of copper from electrolyte solutions containing copper and other metals, such as are mentioned above.

Another object of the invention is to recover the copper of the above object as pure and high quality electrolytic copper.

It is another object of this invention to substantially eliminate the loss of the other metals contained in the electrolyte which loss occurred with the use of prior methods.

Still another object of the invention is to accomplish the above objects by carrying out the method in batchwise rather than continuous operations.

Other objects and advantages of the invention will become more apparent from the study of the following descriptions.

To form the electrolytic solution containing in solubilized form the metals contained in pyrite, the pyrite is first roasted in a furnace that will produce a maximum of water soluble copper, cobalt, nickel, zinc, etc. A well known hearth roaster can be used. However, in recent years a shaft-type roaster, where the ore is kept in suspension by the gases being flown up through a layer of the ore, usually called a fluo-solid roaster, has been substituted for the hearth roaster. The sulfur is removed as sulfur dioxide gas. This gas may be recovered for the manufacture of sulfuric acid. The residue which remains after this roasting or calcining is known a pyrite cinders or pyrite calcines.

The soluble non-ferrous metals are then extracted from the pyrites cinder or calcines by means of cyclic percolation leaching, or counter current decantation and filtration or any other known method. The acidity of the solvent is adjusted to obtain a final solution extract with a pH of 2.5.

The following analysis is an example of one type of pyrite cinders which may be so treated:

Fe—52.3% (predominantly present as $Fe_2O_3$)
Cu—1.70% (predominantly present as sulphate)
Co—1.05% (predominantly present as sulpate)
Ni—0.16% (predominantly present as sulphate)
Zn—0.40% (predominantly present as sulphate)
Mn—0.04% (predominantly present as sulphate and oxide)

The method of the invention will now be described in detail. The above electrolyte solution containing copper, cobalt, nickel, zinc, etc., is introduced batchwise into a plurality of electrolytic cells. Any number of cells may be used and each cell can contain any number of cathodes and anodes as desired by the operator. One preferred arrangement is to use 15 cathodes in each cell. Each cathode consists of a copper sheet of about 25 square feet of surface.

As mentioned above, the method involves a batchwise process and each cathode is preferably subjected to about 25 separate batches of electrolyte in order to produce the usual commercial or electrolytic copper cathode.

After the electrolyte has been introduced into the cells, the electrodes are then connected with the electrical current supply and the electrolysis begins.

To cite a run for example: At the start of the electrolysis the copper concentration is about 38 g./l. of electrolyte. The current supplied to the cells is about 10 amperes per square foot of cathode surface with approximately two volts per cell. Without making any changes in the current setting, the solution is depleted of copper to about 0.05 g./l.

The electrolyte in the cells may be agitated either by bubbling a controlled amount of air through the column of solution in the cells or simply by effective recirculation of the electrolyte through the cells.

Toward the end of this batchwise electrolytic treatment of copper solution, carrying cobalt, nickel, zinc etc., the deposit on the cathodes darkens and is no longer coherent. The copper deposit formed from a single batch would be practically worthless as electrolytic copper, because of the still very thin cathode; only about one pound per square foot depending upon the spacing of the anodes and cathodes in the cells. Since one of the objects of this invention is to recover the copper as pure and high quality electrolytic copper, this loose copper is incorporated into the cathode in the following manner:

As the copper content of the electrolyte reaches the desired level of around 0.05 gram per liter all of the electrolyte is drained or pumped from the cell and set aside for recovery of metal, such as cobalt and nickel. None of this electrolyte is ever returned to the cell. During the process of discharging, the current to the electrolytic copper cell is turned off and will be turned on when the cell is again recharged with fresh strong electrolyte solution from the leaching process. As the current is turned on, the copper from this strong solution, with about 35.0 grams per liter of copper, will deposit around and over the small amount of soft copper on the cathodes, deposited at the end of the previous batch, and form a hard continuous layer of copper with the copper deposited during the previous batch including the soft layer which is automatically converted to hard, bright copper when the fresh copper is deposited thereover. With the formed cathode, one cannot determine the separate copper laminations formed from each batch of fresh electrolyte since the layers of copper from each batch are so intimately joined together. Finally after say 25 batches the electrolysis, the last batch is cut short just before the loose and dark copper is formed in order to produce a cathode that will be comparable to those produced by standard electrowinning methods. Whatever copper is left in the last of a series of batches will constitute the first batch of the next following series.

The purity and quality of the cathodes are not adversely affected by this batchwise manipulation since the darkened and sometimes somewhat roughened condition of the cathode surfaces disappear being converted to high grade copper when the cell is again electrolyzed with a new change of strong electrolyte.

The purity of the formed copper on the cathodes meets the required standards. For example, a strong electrolyte with 40 g./l. of copper, 8 g./l. of iron, 20 g./l. of cobalt, 7.5 g./l. of zinc and 2.5 g./l. of nickel produced a cathode comprising 99.86% of copper, 0.001% of iron, 0.01% of cobalt, 0.0015% of zinc and a trace of nickel.

The spent electrolyte produced by this method is now ready for further treatment to recover any or all of the metals remaining in solution by known processes.

Obviously many modifications and variations of the present invention are possible in the light of the above teachings. It is, therefore, to be understood that within the scope of the appended claims the invention may be practiced otherwise than as specifically described.

What is claimed is:

1. A method for recovering by electrolysis up to 99.9% of the total amount of dissolved copper as high grade copper from fresh acidic electrolyte solution having a comparative high concentration of copper comprising the steps of introducing a batch of said electrolyte solution into an electrolytic cell in contact with lead anodes and copper cathodes, maintaining a constant current density for the cathode of about 10 amps per sq. foot of cathode, continuing the electrolysis until the copper content of the solution is down to about 0.05 gram/liter with the last portion of said recovered copper being in the form of a loose and darkened deposit on the cathodes, recharging said cell with a fresh batch of said copper containing electrolyte, and repeating the above electrolysis steps to additionally collect said fresh copper on said same cathodes supporting said last portion of loose and darkened deposit whereby the loose and darkened deposit is incorporated with the fresh copper deposited and automatically converted to an adherent, hard and bright form of high grade copper as the fresh copper is deposited thereover from said fresh electrolyte.

2. The method according to claim 1 wherein each batch of electrolyte solution initially has a copper concentration of around 38 g./l.

3. The method of claim 1 wherein the process is repeated a number of times, and is terminated in the last batch run after about 90% of the copper in the electrolyte solution of the last run has precipitated on the cathode.

References Cited by the Examiner

UNITED STATES PATENTS 725,998 4/03 Sjoestedt et al. _____ 204—108

OTHER REFERENCES

Mantell: Electrochemical Engineering, 4th edition (1960), McGraw-Hill, New York, pages 198–210.

JOHN H. MACK, *Primary Examiner.*

MURRAY TILLMAN, WINSTON A. DOUGLAS,
*Examiners.*